(12) United States Patent
Kandil et al.

(10) Patent No.: US 9,327,840 B2
(45) Date of Patent: May 3, 2016

(54) RAM AIR TURBINE WITH A SPEED ENGAGED CLUTCH

(75) Inventors: Magdy A. Kandil, Rockford, IL (US); David Everett Russ, Rockford, IL (US); Stephen George Mican, West Point, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 545 days.

(21) Appl. No.: 13/590,605

(22) Filed: Aug. 21, 2012

(65) Prior Publication Data

US 2014/0054127 A1 Feb. 27, 2014

(51) Int. Cl.
| | | |
|---|---|---|
| F03D 7/04 | (2006.01) |
| B64D 41/00 | (2006.01) |
| F16D 43/04 | (2006.01) |
| F16D 13/12 | (2006.01) |
| F16D 43/10 | (2006.01) |
| F16D 43/18 | (2006.01) |
| F16D 43/14 | (2006.01) |
| F16D 43/202 | (2006.01) |

(52) U.S. Cl.
CPC ............... B64D 41/007 (2013.01); F03D 7/04 (2013.01); F16D 13/12 (2013.01); F16D 43/04 (2013.01); F16D 43/10 (2013.01); F16D 43/18 (2013.01); F16D 43/2022 (2013.01); F16D 2043/145 (2013.01)

(58) Field of Classification Search
CPC .......... B64D 1/007; F03D 7/04; F03D 7/041; F16D 13/12; F16D 13/14; F16D 43/04; F16D 43/06; F16D 43/08; F16D 43/10; F16D 43/18; F16D 43/2022; F16D 2043/14; F16D 2043/145; F16D 43/14; F16D 43/20; F16D 43/21; F16D 43/2028; F16D 13/10; F16D 41/00; F16D 41/04; F16D 41/20; F16D 41/203; F16D 41/206; F16D 43/09; F16D 43/12
USPC ............. 192/55.5, 105 C, 105 CS, 41 S, 81 C
See application file for complete search history.

(56) References Cited

U.S. PATENT DOCUMENTS

| | | | |
|---|---|---|---|
| 1,966,267 A * | 7/1934 | Starkey ................. | F16D 41/206 192/41 S |
| 2,607,312 A * | 8/1952 | Johnson .................. | F16D 43/06 192/105 CP |
| 4,464,579 A * | 8/1984 | Schwarz ......................... | 290/44 |
| 4,613,763 A * | 9/1986 | Swansen ........................ | 290/44 |
| 7,705,480 B2 * | 4/2010 | Nakamura .............. | F03D 9/002 290/1 E |
| 2014/0054127 A1 * | 2/2014 | Kandil et al. ............. | 192/105 C |

FOREIGN PATENT DOCUMENTS

FR 1016348 A * 11/1952

OTHER PUBLICATIONS

Machine translation of FR 1016348 A (Nov. 7, 1952) from Espacenet.*

* cited by examiner

Primary Examiner — Igor Kershteyn
Assistant Examiner — Christopher R Legendre
(74) Attorney, Agent, or Firm — Stephen G. Mican (57) ABSTRACT

A ram air turbine with a turbine assembly and a power train, the turbine assembly only coupling to the entire power train upon reaching a desired rotational speed of the turbine assembly, the ram air turbine having a clutch mechanism, the engagement of which couples the turbine assembly to at least a portion of the power train, and a speed control mechanism that engages the clutch mechanism only when the turbine assembly attains at least the desired rotational speed.

8 Claims, 8 Drawing Sheets

RAM AIR TURBINE WITH A SPEED ENGAGED CLUTCH

Figure 1:
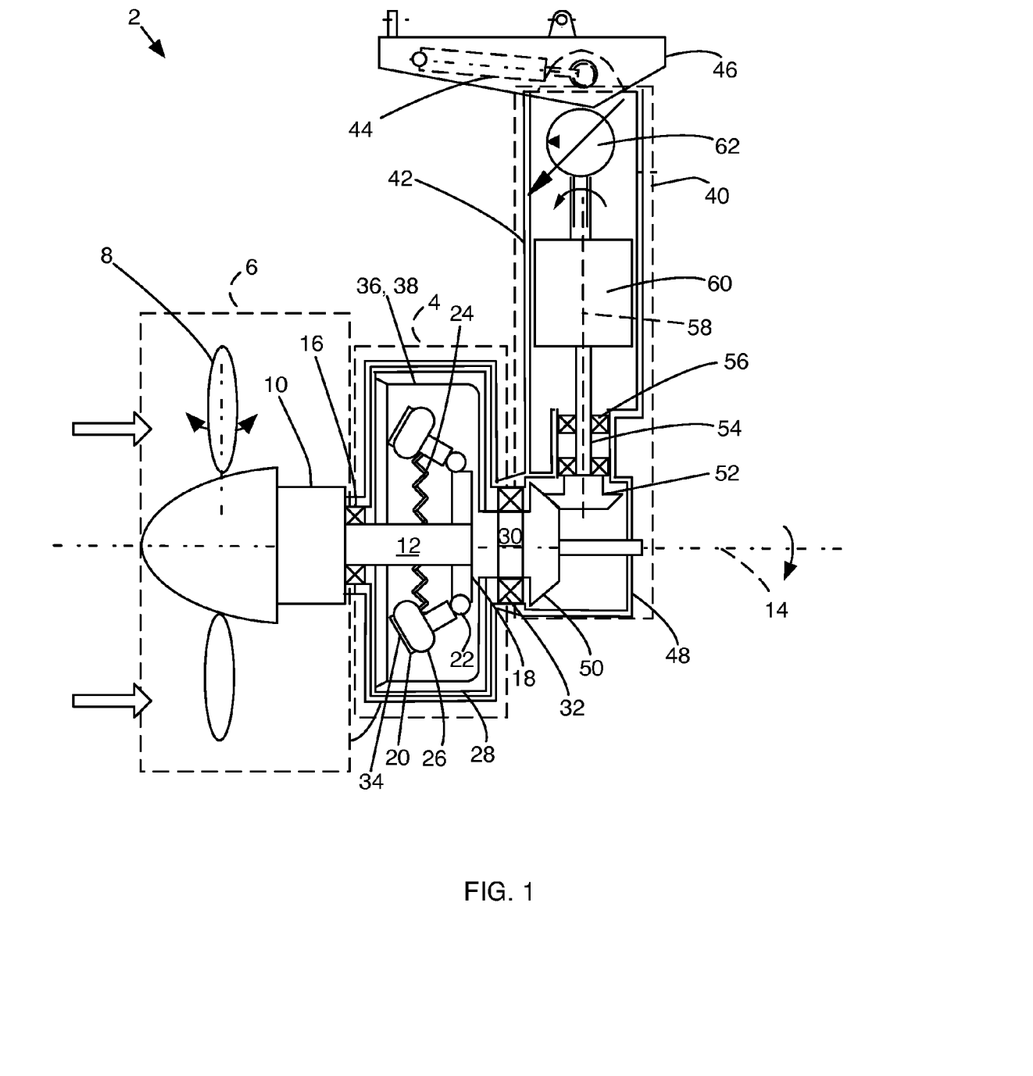
FIG. 1 is a schematic diagram of a ram air turbine with a speed engaged clutch according to a first embodiment, shown as a cross-sectional view for a plane along an axis of the ram air turbine in an at rest position.
Figure 2:
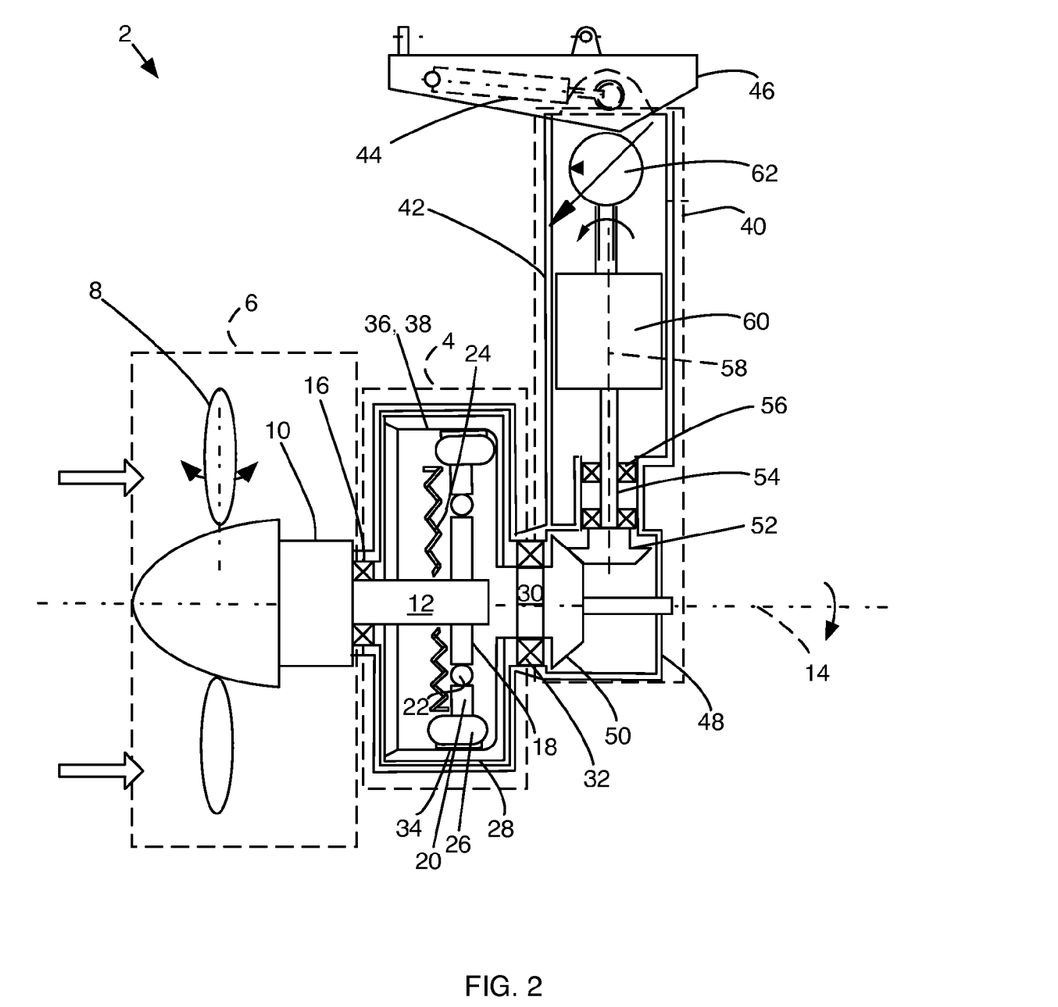
FIG. 2 is a schematic diagram of the ram air turbine with the speed engaged clutch according to the first embodiment, shown in an at speed position.

FIG. 1 is a schematic diagram of a ram air turbine 2 with a speed engaged clutch 4 according to a first embodiment, shown in an at rest position. FIG. 2 is a schematic diagram of the ram air turbine 2 with the speed engaged clutch 4 according to the first embodiment, shown in an at speed condition. Referring to FIGS. 1 and 2 together, the ram air turbine 2 has a turbine assembly 6. The turbine assembly 6 has multiple blades 8 coupled to a hub assembly 10 that spins an input shaft 12 about an axis 14. An input bearing assembly 16 supports the input shaft 12 to provide the input shaft 12 rotational freedom of movement about the axis 14 whilst preventing linear movement of the input shaft 12 along the axis 14.

A rotor assembly 18 within the speed engaged clutch 4 attaches to the input drive shaft 12. The rotor assembly 18 has a clutch shoe 20 attached to each of its distal ends 22, with each clutch shoe 20 having a rotational freedom of movement about the axis 14. A bias spring 24 coupled to each clutch shoe 20 generates a bias force that pulls its respective clutch shoe 20 toward the axis 14. A flyweight 26 coupled to each clutch shoe 20 also has a rotational freedom of movement about the axis 14.

A clutch drum 28 within the speed engaged clutch 4 couples to an output shaft 30 that has a rotational freedom of movement about the axis 14. An output bearing assembly 32 supports the output shaft 30 to provide the output shaft 30 rotational freedom of movement about the axis 14 whilst preventing linear movement of the output shaft 30 along the axis 14. Upon rotation of the input shaft 12, the rotor assembly 18 rotates about the axis 14, causing each flyweight 22 to generate a centrifugal force away from the axis 14.

As the turbine assembly 6 reaches a desired rotational speed, the flyweights 26 generate a centrifugal force that is sufficient to overcome the bias force of their respective bias springs 24 so that a clutch facing 34 on each clutch shoe 20 engages a circumferential clutch facing 36 along an inner circumferential surface 38 of the clutch drum 28. Upon engagement of the clutch facings 34 of the clutch shoes 20 with the clutch facing 36 of the clutch drum 28, the clutch drum 28 and its coupled output shaft 30 rotates about the axis 14 when the turbine assembly 6 attains at least the desired rotational speed, as shown in FIG. 2.

The output shaft 30 couples to a power train 40 housed within a strut 42. A deployment actuator 44 may pivot the strut 42 about a frame assembly 46 that supports the strut 42 into a deployed position as shown. The power train 40 may include a gear box 48 that has an input gear 50, an output gear 52 coupled to the input gear 50, a drive shaft 54 coupled to the output gear 52, and drive shaft bearing assemblies 56 that support the drive shaft 54 to provide the drive shaft 54 rotational freedom of movement about an axis 58. The drive shaft 54 may couple to various power accessories, such as an electrical generator 60 and a hydraulic pump 62.

The delayed engagement of the speed controlled clutch 4 until the turbine assembly 6 reaches at least the desired rotational speed ensures that the load of the power train 40 does not stall the turbine assembly 6 at lower rotational speeds. The choice of the desired rotational speed is such that the turbine assembly 6 can overcome both the breakaway torque level of the gear box 48 and the load of any accessories coupled thereto, such as the generator 60 and the pump 62. Adjustment of the spring rate of the bias springs 24 in combination with the mass of the flyweights 26 can engage the speed engaged clutch 4 at any desired rotational speed of the turbine assembly 6.

Figure 3:
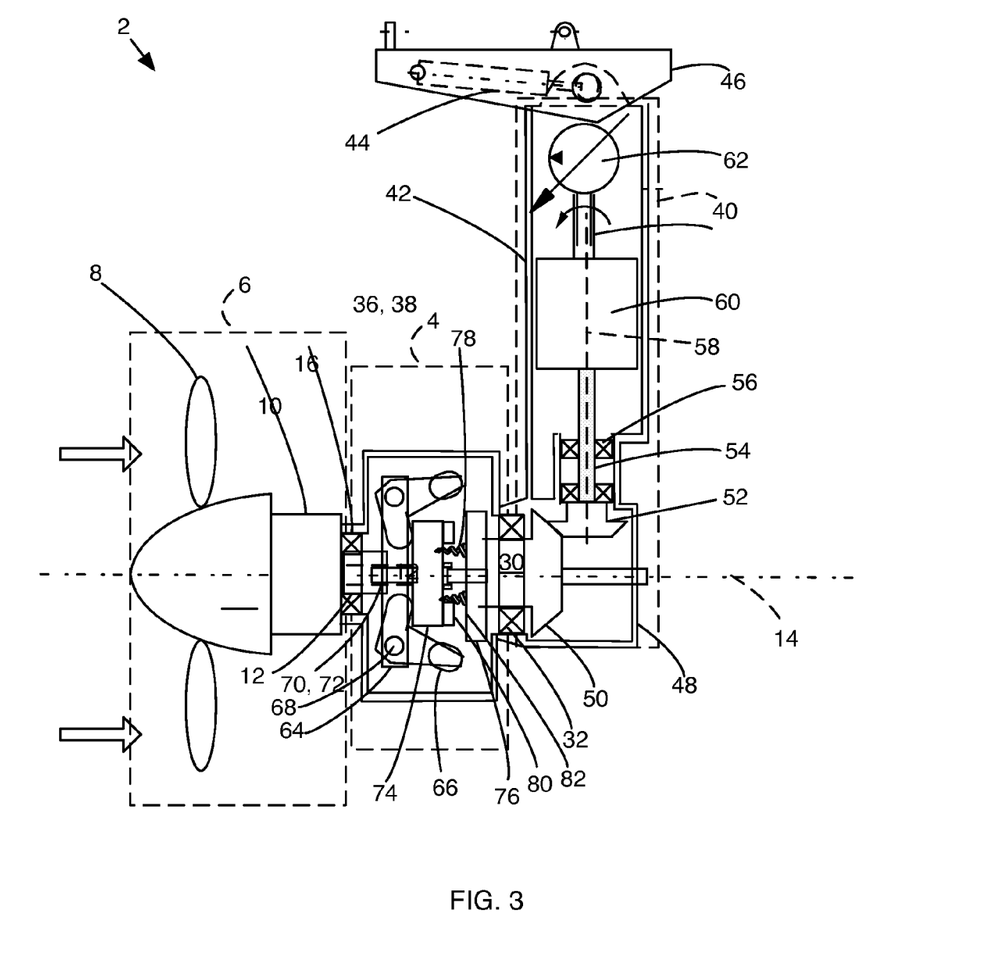
FIG. 3 is a schematic diagram of a ram air turbine with a speed engaged clutch according to a second embodiment, shown as a cross-sectional view for a plane along an axis of the ram air turbine in an at rest position.
Figure 4:
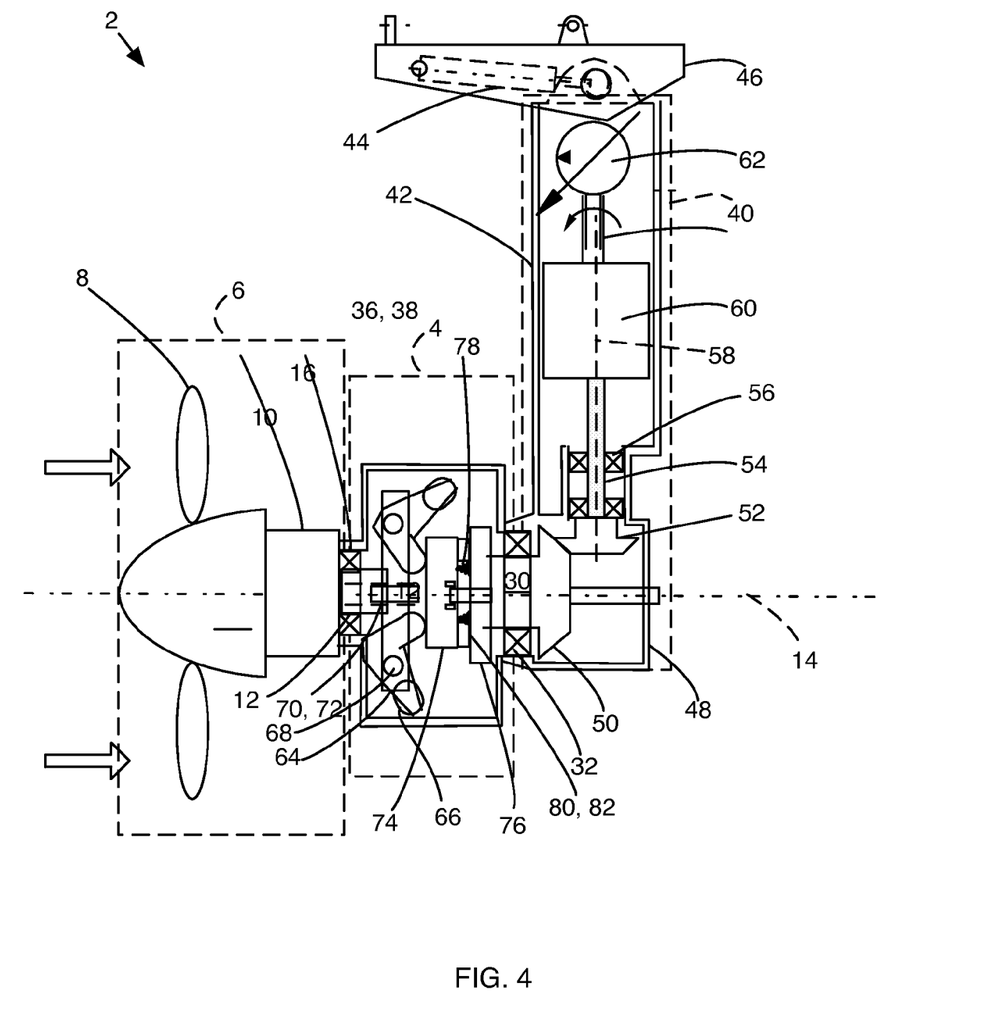
FIG. 4 is a schematic diagram of the ram air turbine with the speed engaged clutch according to the second embodiment, shown in an at speed position.

FIG. 3 is a schematic diagram of the ram air turbine 2 with the speed engaged clutch 4 according to a second embodiment, shown in an at rest position. FIG. 4 is a schematic diagram of the ram air turbine 2 with the speed engaged clutch 4 according to the second embodiment, shown in an at speed position. Referring to FIGS. 3 and 4 together, the speed engaged clutch 4 has a rotor assembly 64 coupled to the input shaft 12. The rotor assembly 64 has a flyweight 66 attached to each of its distal ends 68, with each flyweight 66 having a rotational freedom of movement about the axis 14.

The input shaft 12 has a splined aperture 70 extending through its distal end 68 that retains a splined slidable shaft 72 that engages the splines of the splined aperture 70 to let the input shaft 12 rotate the splined slidable shaft 72 about the axis 14 whilst allowing the splined slidable shaft 72 to have a linear freedom of movement along the axis 14. An axially movable clutch disc 74 that couples to the splined slidable shaft 72 faces an adjacent axially fixed clutch disc 76 that couples to the output shaft 30. A bias spring 78 generates a bias force that pushes the axially movable clutch disc 74 away from the axially fixed clutch disc 76 when the ram air turbine 2 is at rest, as shown in FIG. 3.

As the turbine assembly 6 reaches the desired rotational speed, the flyweights 66 generate centrifugal forces away from the axis 14 that rotate the flyweights 66 about the distal ends 68 of the rotor assembly 64 that is sufficient to overcome the bias force of the bias spring 78, thereby pushing the axially movable clutch disc 74 toward the axially fixed clutch disc 76 until a clutch facing 80 for the axially movable clutch disc 74 engages a clutch facing 82 for the axially fixed clutch disc 76, as shown in FIG. 4. Adjustment of the mass of the spring rate of the bias spring 78 in combination with the mass of the flyweights 66 can engage the speed engaged clutch 4 at any desired rotational speed of the turbine assembly 6.

Figure 5:
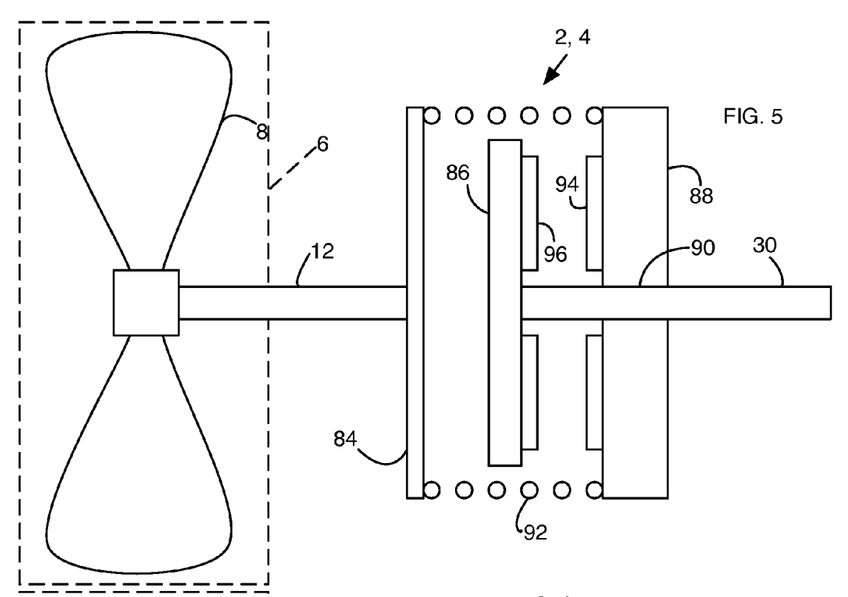
FIG. 5 is a schematic diagram of a ram air turbine with a speed engaged clutch according to a third embodiment, shown as a cross-sectional view for a plane along an axis of the ram air turbine in an at rest position.
Figure 6:
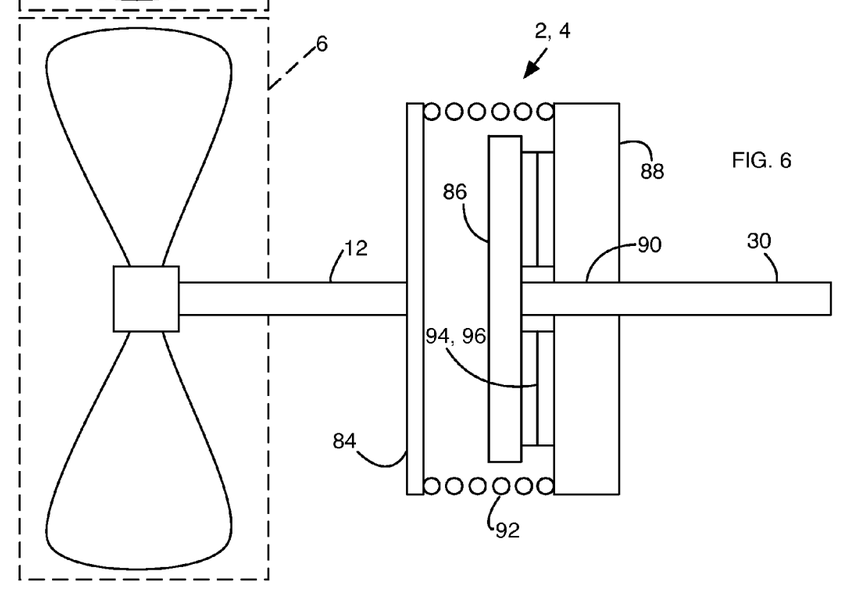
FIG. 6 is a schematic diagram of the ram air turbine with the speed engaged clutch according to the third embodiment, shown in an at speed position.

FIG. 5 is a schematic diagram of the ram air turbine 2 with the speed engaged clutch 4 according to a third embodiment, shown in an at rest position. FIG. 6 is a schematic diagram of the ram air turbine 2 with the speed engaged clutch 4 according to the third embodiment, shown in an at speed position. Referring to FIGS. 5 and 6 together, the speed engaged clutch 4 has an axially fixed drive member 84 coupled to the input shaft 12 and an axially fixed clutch disc 86 coupled to the output shaft 30. An axially movable clutch disc 88 mounts on the output shaft 30 by means of a central aperture 90 that allows the axially movable clutch disc 88 both radial and axial freedom of movement relative to the axis 14.

A helical spring 92 has one end coupled to the axially fixed drive member 84 and the other end coupled to the axially movable clutch disc 88. As shown in FIG. 5, when the ram air turbine 2 is at rest there is a gap between the axially fixed clutch disc 86 and the axially movable clutch disc 88. As the turbine assembly 6 begins to rotate the input shaft 12, the input shaft 12 in turn rotates the axially fixed drive member 84. The axially fixed drive member 84 in turn rotates the helical spring 92, which rotates the axially movable clutch disc 88 on the output shaft 30.

However, the mass of the axially fixed clutch disc 88 causes rotational inertia that resists rotation, and this rotational inertia results in the axially movable clutch disc 88 rotating at an increasingly slower speed than the axially fixed drive member 84 as the axially fixed drive member 84 increases rotational speed. This causes the axially fixed drive member 84 to "wrap up" the helical spring into a solid shaft as the turbine assembly 6 approaches the desired rotational speed, thereby axially contracting the helical spring 92, which causes the helical spring 92 to pull the axially movable clutch disc 88 along the output shaft 30 toward the axially fixed clutch disc 86 until a clutch facing 94 for the axially movable clutch disc 88 engages a clutch facing 96 for the axially fixed clutch disc 86, as shown in FIG. 6. Adjustment of the spring rate of the helical spring 92 in combination with the mass of the axially movable clutch disc 88 can engage the speed engaged clutch 4 at any desired rotational speed of the turbine assembly 6.

Figure 7:
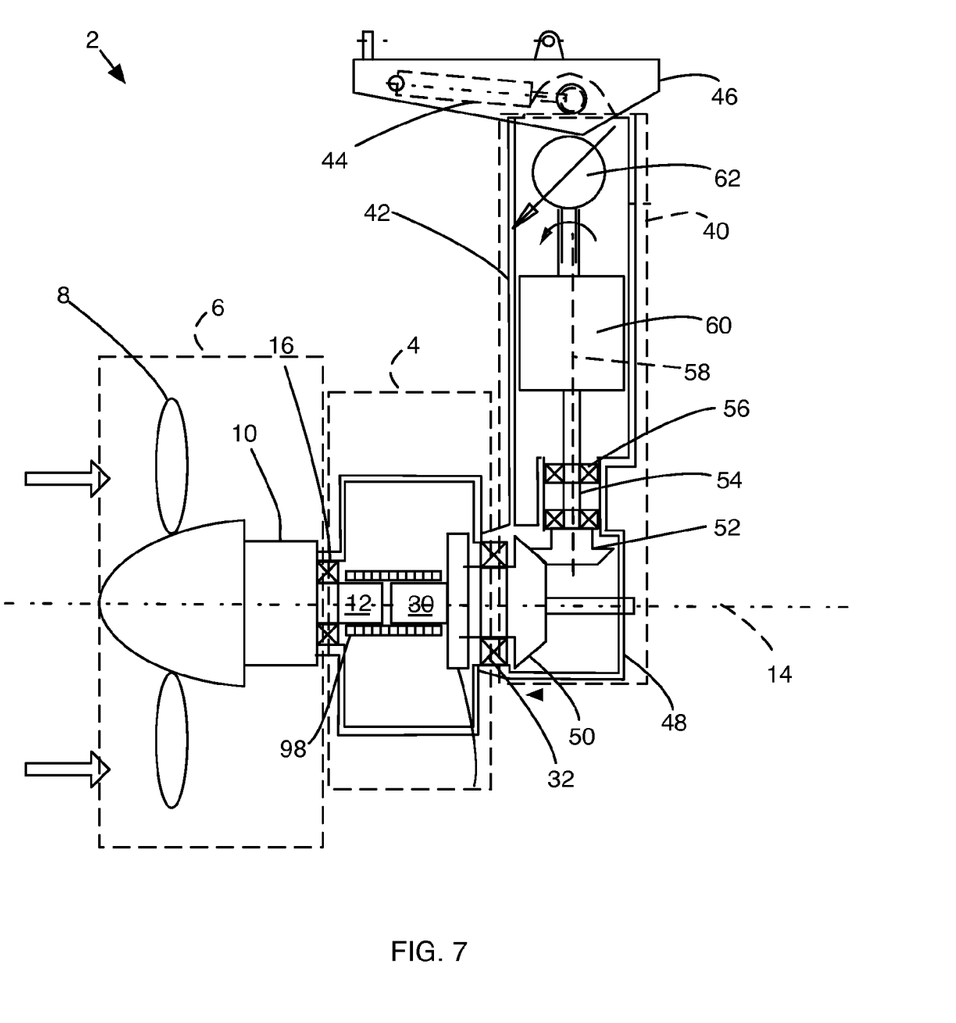
FIG. 7 is a schematic diagram of a ram air turbine with a speed engaged clutch according to a fourth embodiment, shown as a cross-sectional view for a plane along an axis of the ram air turbine in an at rest position.
Figure 8:
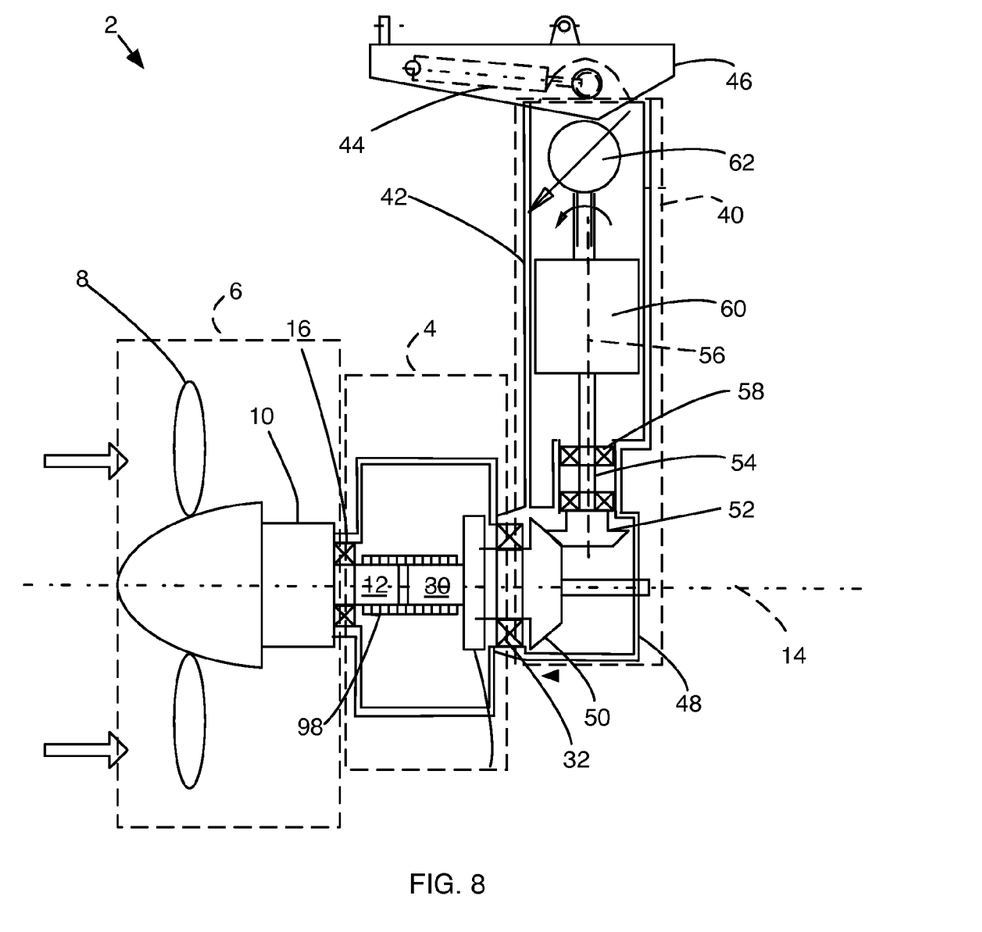
FIG. 8 is a schematic diagram of the ram air turbine with the speed engaged clutch according to the fourth embodiment, shown in an at speed position.

FIG. 7 is a schematic diagram of the ram air turbine 2 with the speed engaged clutch 4 according to a fourth embodiment, shown in an at rest position. FIG. 8 is a schematic diagram of the ram air turbine 2 with the speed engaged clutch 4 according to the fourth embodiment, shown in an at speed position. Referring to FIGS. 7 and 8 together, the speed engaged clutch 4 has a helical spring 98, with one end wound around the input shaft 12 and the other end wound around the output shaft 30. The diameter of the helical spring 98 is slightly less than the diameter of the input shaft 12 and the output shaft 30 to provide a loose resistance fit when the ram air turbine 2 is at rest, as shown in FIG. 7.

As the turbine assembly 6 rotates the input shaft 12, the input shaft 12 rotates the helical spring 98. However, due the loading of the power train 40, the output shaft 30 has a resistance to rotation that causes the helical spring 98 slip on the input shaft 12 and the output shaft 30. As the rotational speed of the turbine assembly 6 increases, the frictional coupling between the helical spring 98 and both the input shaft 12 and the output shaft 30 causes the helical spring 98 to "wrap up" and radially contract as the turbine assembly 6 approaches the desired rotational speed, thereby providing a slip-less coupling between the input shaft 12 and the output shaft 30 when the turbine assembly 6 attains at least the desired rotational speed, as shown in FIG. 8. Adjustment of the resistance fit of the helical spring 98 on the input shaft 12 and the output shaft 30 in combination with the spring rate of the helical spring 98 can engage the speed engaged clutch 4 at any desired rotational speed of the turbine assembly 6.

Figure 9:
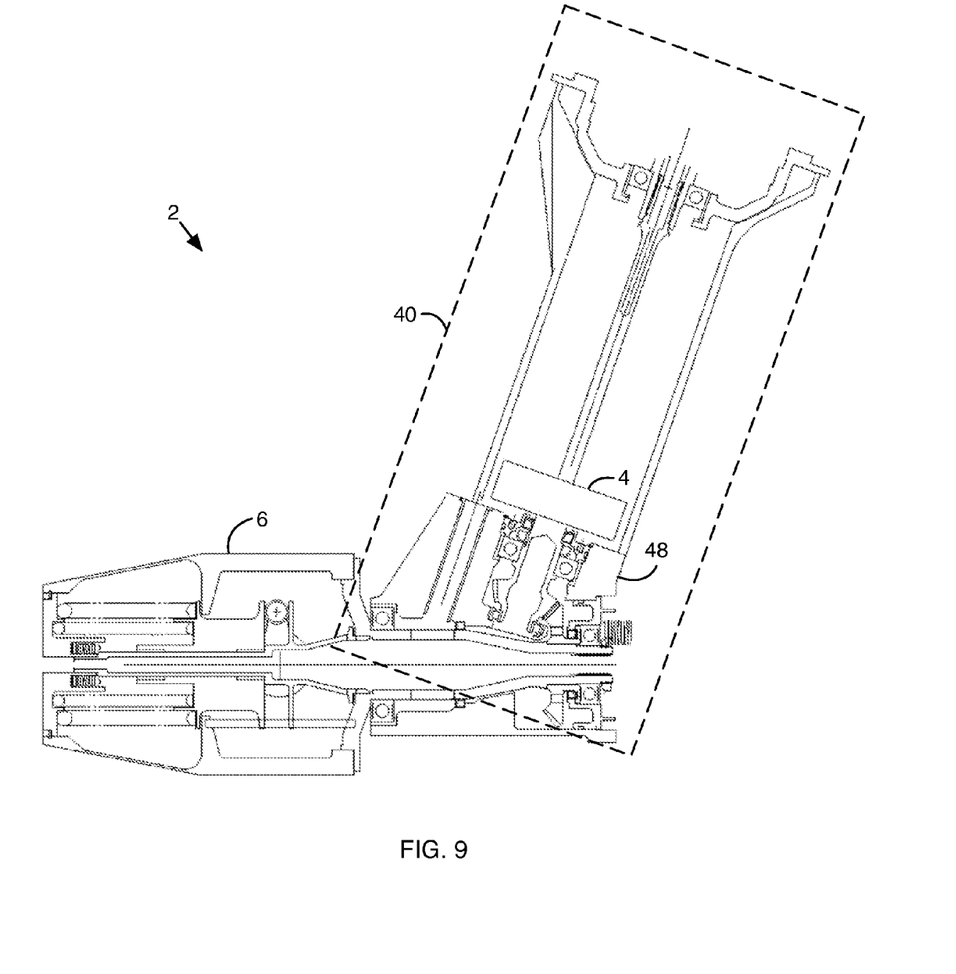
FIG. 9 is a schematic diagram of a ram air turbine with a speed engaged clutch according to the embodiments shown in FIGS. 1 through 8 wherein the speed engaged clutch mounts downstream of a gear box in a power train for the ram air turbine.

FIGS. 1 through 8 show embodiments of the ram air turbine 2 with the speed engaged clutch 4 wherein the speed engaged clutch 4 mounts downstream of the turbine assembly 6 and upstream of the gear box 48 within the power train 40. It is possible to mount the speed engaged clutch 4 according to any of the embodiments shown in FIGS. 1 through 8 downstream of the gear box 48 within the power train 40. In this case, the speed engaged clutch 4 does not engage the whole power train 40, but rather the portion of the power train 40 downstream of the gear box 48, as shown in FIG. 9. In this case, the turbine assembly 6 drives the speed engaged clutch 4 through the gear box 48, and upon engagement of the speed engaged clutch 4 when the turbine assembly 6 attains at least the desired rotational speed, the turbine assembly 6 then drives the remainder of the power train 40.

The incorporation of the speed engaged clutch 4 into the ram air turbine 2 allows the turbine assembly 6 to attain at least a desired rotational speed before coupling to at least a portion of the power train 40, thereby ensuring that the load of the power train 40 does not stall the turbine assembly 6 at lower rotational speeds. The described embodiments as set forth herein represents only some illustrative implementations of the invention as set forth in the attached claims. Changes and substitutions of various details and arrangement thereof are within the scope of the claimed invention.

The invention claimed is:

1. A ram air turbine with a turbine assembly and a power train, the turbine assembly only coupling to the entire power train upon reaching a desired rotational speed of the turbine assembly, comprising:
   a clutch mechanism comprising a clutch disc that has a rotational freedom of movement about an axis of the clutch mechanism and is axially movable relative to the axis of the clutch mechanism and a clutch disc that is axially fixed relative to the axis of the clutch mechanism, with the axially movable clutch disc and the axially fixed clutch disc each having clutch facings that face each other; and
   a speed control mechanism comprising at least one spring with an axis of the spring in coincidence with the axis of the clutch mechanism that engages the clutch mechanism only when the turbine assembly attains at least the desired rotational speed.

2. The ram air turbine of claim 1, wherein the speed control mechanism further comprises the spring coupled to the axially movable clutch disc so that the spring generates a bias force that pushes the axially movable clutch disc away from the axially fixed clutch disc and at least two flyweights that have opposed radial freedom of movement relative to the axis of the spring coupled to the axially movable clutch disc whose rotation about the axis of the spring generates a centrifugal force away from the axis of the spring that pushes the clutch facing of the axially movable clutch disc toward the clutch facing of the axially fixed clutch disc until the clutch facings engage each other when the turbine assembly attains at least the desired rotational speed.

3. The ram air turbine of claim 1, wherein the clutch mechanism further comprises an output shaft that couples the axially fixed clutch disc to at least a portion of the power train, with the axially movable clutch disc mounted on the output shaft with axial and rotational freedom of movement about the axis of the clutch mechanism, and the speed control mechanism comprises a drive member driven by the turbine assembly and the spring, which comprises a helical spring that has one end coupled to the drive member and the other end coupled to the axially movable clutch disc and the spring rate of the spring in combination with the mass of the axially movable clutch disc causes the spring to axially contract with respect to the axis of the spring to an extent that the clutch facing of the axially movable clutch disc engages the clutch facing of the axially fixed clutch disc when the turbine assembly attains at least the desired rotational speed.

4. A ram air turbine with a turbine assembly and a power train, the turbine assembly only coupling to the entire power train upon reaching a desired rotational speed of the turbine assembly, comprising:
　a clutch mechanism comprising an input shaft driven by the turbine assembly and an output shaft coupled to the power train that have rotational freedom of movement about an axis of the clutch mechanism; and
　a speed control mechanism comprising a helical spring with an axis of the helical spring in coincidence with the axis of the clutch mechanism, with one of the ends of the helical spring wrapped about the input shaft and the other end of the helical spring wrapped about the output shaft and the fit of the helical spring on the input shaft and the output shaft in combination with a spring rate of the helical spring causing the helical spring to engage both the input shaft and the output shaft when the turbine assembly attains at least the desired rotational speed.

5. A ram air turbine with a turbine assembly and a power train, the turbine assembly only coupling to the entire power train upon reaching a desired rotational speed of the turbine assembly, comprising:
　a clutch mechanism that couples the turbine assembly to at least a portion of the power train, comprising a single clutch input element driven by the turbine assembly and a single clutch output element coupled to at least a portion of the power train that have rotational freedom of movement about an axis of the clutch mechanism, the clutch input element comprising a clutch disc that is axially movable relative to the axis of the clutch mechanism and the clutch output element comprising a clutch disc that is axially fixed relative to the axis of the clutch mechanism, with the axially movable clutch disc and the axially fixed clutch disc each having clutch facings that face each other; and
　a speed control mechanism comprising at least one spring with an axis of the spring in coincidence with the axis of the clutch mechanism that engages the clutch mechanism by coupling the clutch input element to the clutch output element only when the turbine assembly attains at least the desired rotational speed.

6. The ram air turbine of claim 5, wherein the speed control mechanism further comprises the spring coupled to the axially movable clutch disc so that the spring generates a bias force that pushes the axially movable clutch disc away from the axially fixed clutch disc and at least two flyweights that have opposed radial freedom of movement relative to the axis of the spring coupled to the axially movable clutch disc whose rotation about the axis of the spring generates a centrifugal force away from the axis of the spring that pushes the clutch facing of the axially movable clutch disc toward the clutch facing of the axially fixed clutch disc until the clutch facings engage each other when the turbine assembly attains at least the desired rotational speed.

7. The ram air turbine of claim 5, wherein the clutch mechanism further comprises an output shaft that couples the axially fixed clutch disc to the power train, with the axially movable clutch disc mounted on the output shaft with axial and rotational freedom of movement about the axis of the clutch mechanism, and the speed control mechanism comprises a drive member driven by the turbine assembly and the spring, which comprises a helical spring that has one end coupled to the drive member and the other end coupled to the axially movable clutch disc and the spring rate of the spring in combination with the mass of the axially movable clutch disc causes the spring to axially contract with respect to the axis of the spring to an extent that the clutch facing of the axially movable clutch disc engages the clutch facing of the axially fixed clutch disc when the turbine assembly attains at least the desired rotational speed.

8. A ram air turbine with a turbine assembly and a power train, the turbine assembly only coupling to the entire power train upon reaching a desired rotational speed of the turbine assembly, comprising:
　a clutch mechanism that couples the turbine assembly to at least a portion of the power train, comprising an input shaft driven by the turbine assembly and an output shaft coupled to the power train that have rotational freedom of movement about an axis of the clutch mechanism; and
　a speed control mechanism comprising a helical spring with an axis of the helical spring in coincidence with the axis of the clutch mechanism, with one of the ends of the helical spring wrapped about the input shaft and the other end of the helical spring wrapped about the output shaft and the fit of the helical spring on the input shaft and the output shaft in combination with a spring rate of the helical spring causing the helical spring to engage both the input shaft and the output shaft when the turbine assembly attains the desired rotational speed.

* * * * *